US010875571B2

(12) United States Patent
Maeshima

(10) Patent No.: US 10,875,571 B2
(45) Date of Patent: Dec. 29, 2020

(54) MOTOR CONTROL SYSTEM AND ELECTRIC POWER STEERING SYSTEM

(71) Applicant: Nidec Corporation, Kyoto (JP)

(72) Inventor: Osamu Maeshima, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 158 days.

(21) Appl. No.: 16/315,171

(22) PCT Filed: Jul. 19, 2017

(86) PCT No.: PCT/JP2017/026156
§ 371 (c)(1),
(2) Date: Jan. 4, 2019

(87) PCT Pub. No.: WO2018/016541
PCT Pub. Date: Jan. 25, 2018

(65) Prior Publication Data
US 2019/0233002 A1 Aug. 1, 2019

(30) Foreign Application Priority Data
Jul. 19, 2016 (JP) .................. 2016-141796

(51) Int. Cl.
*A01B 69/00* (2006.01)
*B62D 5/04* (2006.01)
(Continued)

(52) U.S. Cl.
CPC .......... *B62D 5/0493* (2013.01); *B60R 16/023* (2013.01); *B62D 5/04* (2013.01);
(Continued)

(58) Field of Classification Search
CPC ....... B62D 5/0493; B62D 5/04; H02P 29/032; B60R 16/023
See application file for complete search history.

(56) References Cited

U.S. PATENT DOCUMENTS 7,130,728 B2 10/2006 Suzuki
9,692,345 B2 6/2017 Masuda
(Continued)

FOREIGN PATENT DOCUMENTS

JP 2006-335157 A 12/2006
JP 2009-062009 A 3/2009
(Continued)

OTHER PUBLICATIONS

Official Communication issued in International Patent Application No. PCT/JP2017/026156, dated Sep. 19, 2017.

*Primary Examiner* — Adam M Alharbi
(74) *Attorney, Agent, or Firm* — Keating & Bennett

(57) ABSTRACT

A motor control system includes plural control circuits and plural motor circuits. Each motor circuit includes an inverter circuit and a coil. The plural motor circuits are controlled by any one of the control circuits or controlled by the plural control circuits in combination. When any one of the control circuits controlling the motor circuits fails, the motor control system performs switching control so that the failing control circuit is disconnected while another normally-operating control circuit controls the corresponding motor circuit. The failure detection and switching control are performed smoothly and quickly to recover the motor control system from the failure, thus enhancing the reliability.

9 Claims, 2 Drawing Sheets

(51) Int. Cl.
    *H02P 27/06*         (2006.01)
    *H02P 5/74*          (2006.01)
    *H02P 29/032*       (2016.01)
    *B60R 16/023*       (2006.01)
    *H02P 25/22*         (2006.01)
    *H02P 29/028*       (2016.01)

(52) U.S. Cl.
    CPC ................ *H02P 5/74* (2013.01); *H02P 25/22* (2013.01); *H02P 27/06* (2013.01); *H02P 29/028* (2013.01); *H02P 29/032* (2016.02)

(56) References Cited

U.S. PATENT DOCUMENTS

| | | | |
|---|---|---|---|
| 2012/0065823 A1 | 3/2012 | Taguchi et al. | |
| 2012/0271513 A1 | 10/2012 | Yoneda et al. | |
| 2019/0210640 A1* | 7/2019 | Ohashi | B62D 6/00 |
| 2019/0372501 A1* | 12/2019 | Wada | H02P 25/22 |

FOREIGN PATENT DOCUMENTS

| | | |
|---|---|---|
| JP | 2010-137860 A | 6/2010 |
| JP | 2014-176215 A | 9/2014 |
| JP | 2016-096709 A | 5/2016 |

* cited by examiner

MOTOR CONTROL SYSTEM AND ELECTRIC POWER STEERING SYSTEM

BACKGROUND OF THE INVENTION

1. Field of the Invention

The present disclosure relates to a motor control system and an electric power steering system.

2. Description of the Related Art

In recent years, there has been demand for an improvement in reliability of vehicles and the like because of increasing social requirements for traffic safety and the like. If a component constituting a vehicle fails, for example, the vehicle is required to have a function or a structure that can overcome the failure. As one of the measures to address such requirements, a portion that constitutes a vehicle and is typically composed of a single internal structure is composed of two or more identical internal structures to improve the reliability. Such a structure is sometimes expressed as "being redundant" in this specification. When a failure is detected in one of the two or more identical internal structures, another normal one of the redundantly provided internal structures is activated. The vehicle thereby quickly recovers to the normal operation state. This improves the reliability of the vehicle.

Conventional vehicles include an electric power steering system that assists the driver's operation (steering) of the steering wheel. Redundant systems as described above have been proposed for electric power steering systems.

In recent years, as vehicles are required to have higher reliability, electric power steering systems are required to include a recovery function for not only failures of inverters and motor windings but also failures of control units. To address such requirements, in some configurations which are recently being employed, two or more control units are provided for a motor circuit including two or more inverters and two groups of motor windings corresponding thereto. The issue of such configurations is how to perform accurate recovery according to the situation upon detection of a failure in any one of the control units.

SUMMARY OF THE INVENTION

A motor control system that controls a multi-phase electric motor according to an aspect of the disclosure, includes at least: first and second control circuits; and at least two motor circuits each including an inverter and a coil. The first and second control circuits include first and second monitoring circuits, respectively. A monitoring communication path is provided between the first control circuit and first monitoring circuit and is used for the first control circuit and first monitoring circuit to respectively check whether the first monitoring circuit and first control circuit are operating normally. A monitoring communication path is provided between the second control circuit and second monitoring circuit and is used for the second control circuit and second monitoring circuit to respectively check whether the second monitoring circuit and second control circuit are operating normally. An inter-control circuit communication path between the first and second control circuits and is used for the first and second control circuits to respectively check whether the second and first control circuits are operating normally. A switching circuit is provided between the first and second control circuits and the at least two motor circuits and is selectively set to one of a first interconnection mode in which the first control circuit controls all of the at least two motor circuits and a second interconnection mode in which the second control circuit controls all of the at least two motor circuits. The switching circuit is selectively set to the first interconnection mode in a basic operation state of the motor control system. When the first monitoring circuit detects a failure of the first control unit in the basic operation state, the first monitoring circuit resets the first control circuit. The second control circuit detects the reset state of the first control circuit through the inter-control circuit communication path to recognize that the first control circuit has failed and causes the switching circuit to select the second interconnection mode to control all of the at least two motor circuits.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, a description is given of examples of a motor control system and an electric power steering system with reference to the drawings.

Figure 1:
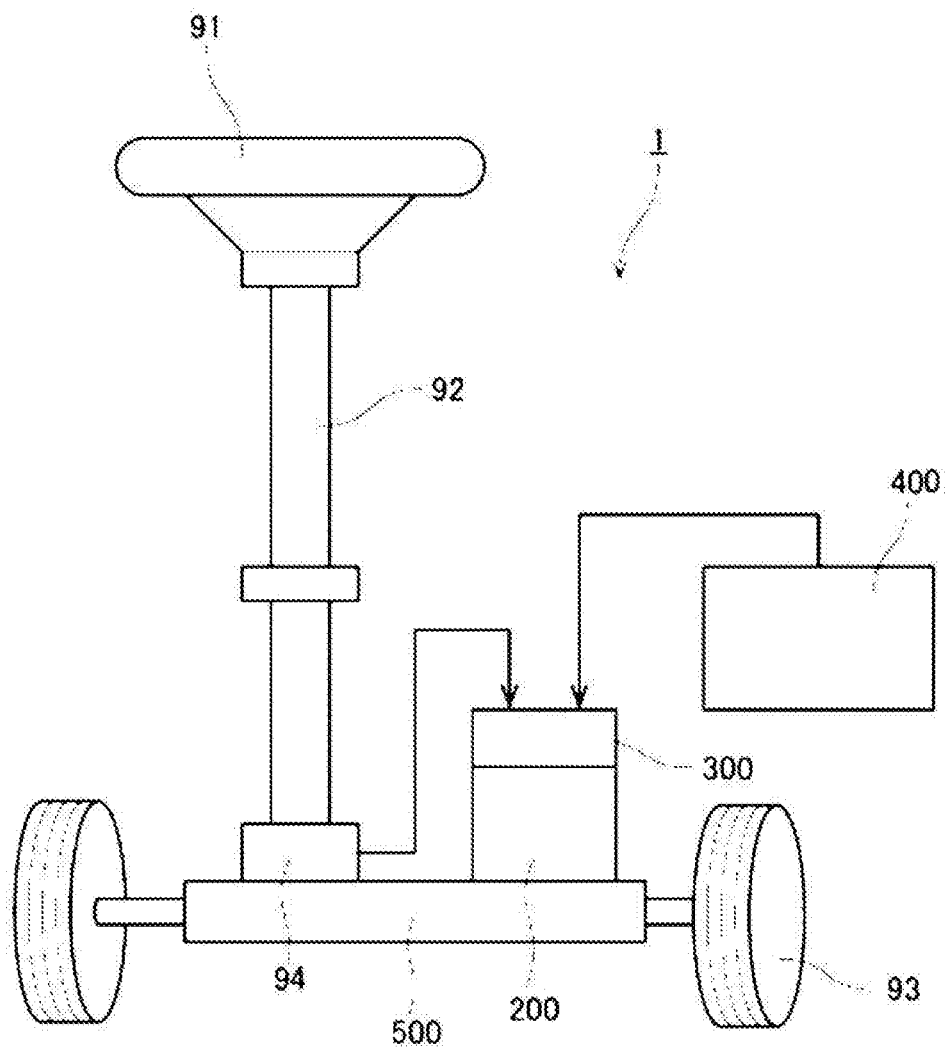
FIG. 1 is a schematic diagram of an electric power steering system.

FIG. 1 illustrates a schematic diagram of an electric power steering system. An electric power steering system 1 is a system that assists the driver's steering operation in a transportation device, such as automobiles. The electric power steering system 1 includes a torque sensor 94, a motor 200', and a motor control system 300.

The torque sensor 94 is attached to a steering shaft 92. When the driver operates a steering wheel (hereinafter, also referred to as a handle) 91 to rotate the steering shaft 92, the torque sensor 94 detects torque applied to the steering shaft 92. A torque signal, which is a detection signal of the torque sensor 94, is outputted from the torque sensor 94 to the motor control system 300. The motor control system 300 drives the motor 200 based on the torque signal inputted from the torque sensor 94. The motor control system 300 may be configured to refer to other information (vehicle speed, for example) as well as the torque signal.

The motor control system 300 supplies driving current to the motor 200 using electric power obtained from a power supply source 400. The driving force generated by the motor 200 is transmitted to wheels 93 through a gear box 500. The steering angle of the wheels 93 thereby changes. The electric power steering system 1 amplifies the torque of the steering shaft 92 through the motor 200 to change the steering angle of the wheels 93. The driver can therefore operate the steering wheel 91 with small force.

Figure 2:
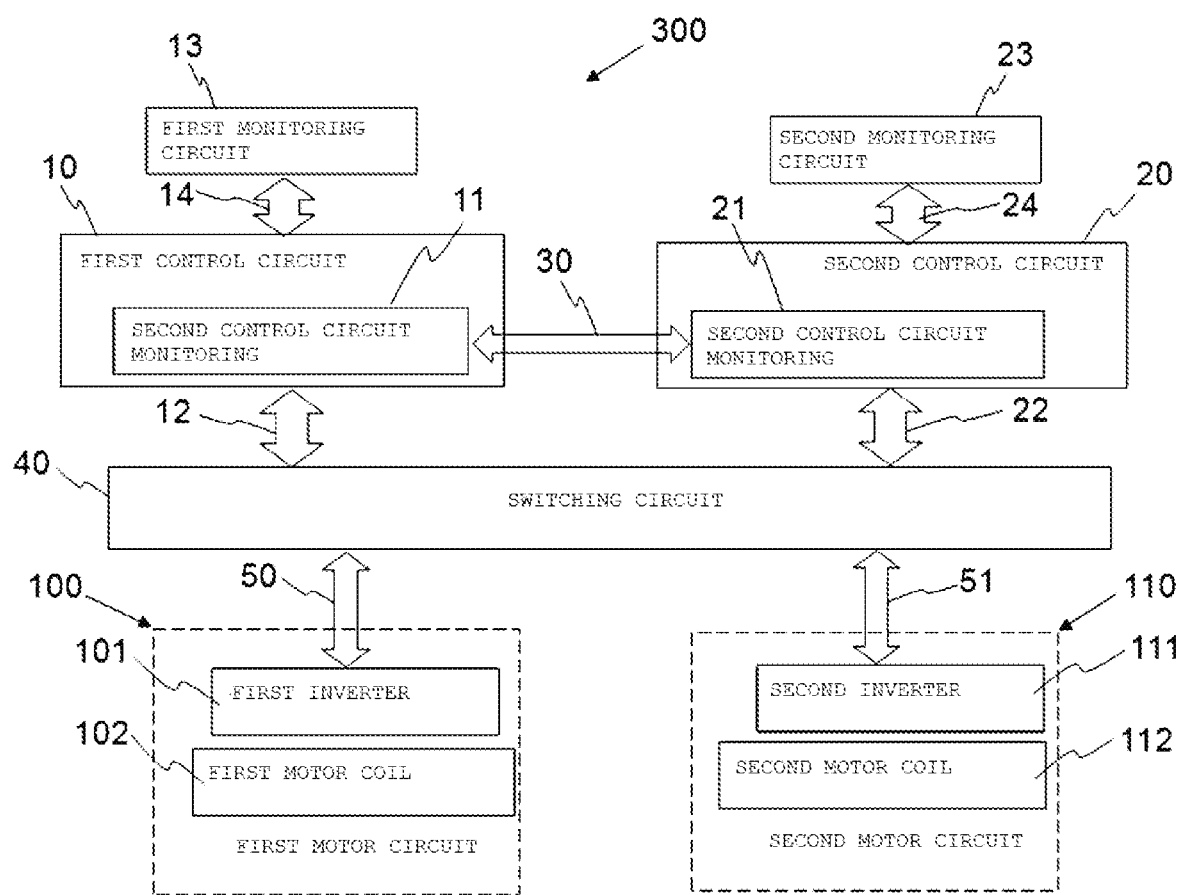
FIG. 2 is a block diagram illustrating the configuration of a motor control system including two control units.

FIG. 2 is a block diagram illustrating the internal structure of the motor control system of the first embodiment. The motor control system 300 includes two motor circuits 100 and 110, two control circuits 10 and 20, and a switching circuit 40.

The motor circuit 100 includes a first inverter 101 and a first motor coil 102 while the motor circuit 110 includes a second inverter 111 and a second motor coil 112. The control circuits 10 and 20 are provided with first and second monitoring circuits 13 and 23, respectively, which monitor whether the respective control circuits are operating normally. In order to monitor whether the control circuits are operating normally, monitoring communication paths 14 and 24 are provided between the control circuits and respective monitoring circuits. The first control circuit 10 further includes a second control circuit monitoring unit 11, which monitors whether the second control circuit 20 is operating normally. The second control circuit 20 further includes a first control circuit monitoring unit 21, which monitors whether the first control circuit 10 is operating normally. In order to monitor whether the first and second control circuits 10 and 20 are operating normally, a control circuit communication path 30 is provided between the control circuits.

From the first and second control circuits 10 and 20, first and second control wires 12 and 22, which control the respective motor circuits, are connected to one side of the switching circuit 40, respectively. From the first and second motor circuits 100 and 110, first and second motor wires 50 and 51, which are directed to the respective control circuits, are connected to the other side of the switching circuit 40, respectively. These motor wires are assumed to be control lines to control on and off of the inverters. The power line to supply power to the motor coils is laid by a publicly-known method and is not illustrated.

The switching circuit 40 executes switching to any one of the following four modes based on an instruction from any one of the control circuits.

(1) Switching Mode 1: In this mode, the first control wire 12 is connected to the first motor wire 50 and the second motor wire 51 while the second control wire 22 is not connected to any motor circuit. By executing this switching mode, the first and second motor circuit 100 and 110 are controlled by the first control circuit 10.

(2) Switching Mode 2: In this mode, the second control wire 22 is connected to the first motor wire 50 and the second motor wire 51 while the first control wire 12 is not connected to any motor. By executing this switching mode, the first and second motor circuits 100 and 110 are controlled by the second control circuit 20.

(3) Switching Mode 3: In this mode, the first control wire 12 is connected to the first motor wire 50 while the second control wire 22 is connected to the second motor wire 51. By executing this switching mode, the first motor circuit 100 is controlled by the first control circuit 10 while the second motor circuit 110 is controlled by the second control circuit 20.

(4) Switching Mode 4: In this mode, the first and second control wires 12 and 22 and the first and second motor wires 50 and 51 are not connected to anything while the first and second motor circuits 100 and 110 are left not producing driving force. In addition, the rotation shaft of the motor is left freely rotatable by external force, that is, in safety mode.

Instructions from the control circuits to perform the above switching may be included in the control wires 12 and 22. Specifically, the instructions may be assigned as switching-dedicated wires. Alternatively, the switching operation may be implemented by exchange of commands with the switching circuit 40 or other means.

Hereinabove, the block diagram illustrating the internal structure of the motor control system of the first embodiment in FIG. 2 is described. In addition to the above description, the motor control system includes not-illustrated additional portions. These are additionally described in the following detailed description about the operation.

Next, a description is given of the basic operation in the first embodiment. At first, the basic operation state is defined. In the basic operation state, the switching circuit 40 is set to Switching Mode 1. The first control circuit 10 therefore controls the first and second motor circuits 100 and 110. The control circuits and respective monitoring circuits and the control circuits confirm regularly in short cycles that the control and monitoring circuits are in "the normally operating state".

Consideration is given to a case where the motor control system is in the basic operation state and the first monitoring circuit 13 then detects that the first control circuit 10 has failed at the following detection process, for example. At this process, the first monitoring circuit 13 resets the first control circuit 10 through a not-illustrated additional circuit, a wire included in the first monitoring communication path 14, or the like. Resetting in this case is typically implemented by supplying a reset signal to a reset terminal of a microcomputer included in the first control circuit 10. Alternatively, when a not-illustrated power supply apparatus supplies power to only the first control circuit 10, resetting may be implemented by turning off the power supply apparatus. "Resetting the first control circuit 10" is considered to include an effect of returning the microcomputer of the control circuit of interest to the initial state and stopping the detected malfunction.

When the first control circuit 10 is reset, the second control circuit 20 detects the reset state of the first control circuit 10 through the inter-control circuit communication path 30 and recognizes that the first control circuit 10 is not normally operating. The second control circuit 20 then instructs the switching circuit 40 to switch to Switching Mode 2. The second control circuit 20 thereby controls the two motor circuits 100 and 110. The failing state in which control of the two motor circuits 100 and 110 is out of order because of failure of the first control circuit before switching can shift to the normal control state by the second control circuit instantly, in a time of about 10 msec, for example. The electric power steering system 1 including the motor control system 300 can shift to a normal assisting state while minimizing feelings of discomfort of the driver operating the electric power steering system 1 due to the failure of the first control circuit. In the state after switching in particular, the electric power steering system 1 can operate with both of the two motor circuits operating normally. The electric power steering system is fully assisted by the motor. The electric power steering system can recover from the failing state smoothly with very small burden on the driver and with no feeling of discomfort. This can further enhance safety.

On the other hand, the reset first control circuit 10 sometimes restores the normal functionality by the reset operation. In this case, the second control circuit 20 detects the state of the first control circuit 10 through the inter-control circuit communication path 30 and recognizes that the first control circuit 10 has recovered to the normal state. This state is stored in a state storage of the second control circuit 20. This information is also stored in a state storage of the second monitoring circuit 23 through the second monitoring communication path 24. When the first control circuit is reset but does not recover to the normal state, such a state is stored in those storages in a similar manner. The above stored information is referred to when the second control circuit fails next time as described later. This allows for accurate recovery operation.

When the first control circuit 10 does not recover to the normal state by the reset operation and remains in the failing state, the second control circuit 20 is able to make notification of a failure of the first control circuit 10, turn on a not-illustrated fault lamp, or display warning on a display monitor in order to inform the driver, an external management system that manages the vehicle of interest through a network, or the like that a part of the motor control system 300 is broken. By informing the outside that part of redundant components is broken while the motor control system 300 operates normally, the fault can be fixed quickly.

Next, a description is given of an operation when the first monitoring circuit 13 fails in the aforementioned basic operation state. In this case, the first control circuit 10 detects a failure of the first monitoring circuit 13, and the information of the failure is stored in the state storage unit of the first control circuit 10. The first control circuit 10 also stores the effect of "the first monitoring circuit having failed" in the state storage of the second control circuit 20 through the inter-control circuit communication path 30.

The first control circuit 10 is able to issue a reset instruction to the first monitoring circuit 13. When the first monitoring circuit 13 recovers to the normal state upon the reset instruction, the first control circuit 10 detects the recovery of the first monitoring circuit 13 and stores the information on the resetting in the state storage of the first control circuit 10. When the first monitoring circuit 13 does not recover to the normal state, the memory of the effect of "the first monitoring circuit having failed" stored in the state storage of the first control circuit 10 is maintained.

When the first control circuit 10 fails in such a situation, this failing state is detected by the second control circuit 20 through the inter-control circuit communication path 30. The second control circuit 20 switches the switching circuit 40 from Switching Mode 1 to Switching Mode 2. The first and second motor circuits 100 and 110 are thereby disconnected from the first control circuit 10 that has failed and are controlled by the second control circuit 20. This switching process is instantly conducted, so that the driver continues safe driving without influenced by the failure of the first control circuit 10. The second control circuit 20 therefore records the effect of "the first control circuit 10 having failed" in the state storage of the second control circuit 20.

When the first control circuit 10 fails as described above, the first control circuit 10 can be reset. When the first control circuit 10 recovers to the normal state by the resetting process, the second control circuit 20 detects the recovery and records the effect that "the first control circuit 10 is operating normally" in the state storage of the second control circuit 20. In this case, if the second control circuit 20 fails later, control of the motor circuits 100 and 110 is switched to the first control circuit 10, so that the motor control system 300 recovers to the normal state.

Next, a description is given of operation when the second monitoring circuit 23 fails in the basic operation state. In this case, the second control circuit 20 detects a failure of the second monitoring circuit 23 and records the failure in the state storage of the second control circuit 20. The second control circuit 20 then resets the second monitoring circuit 23. When the failing second monitoring circuit 23 recovers to the normal state by the resetting, the second control circuit 20 records again the effect that "the second monitoring circuit 23 is operating normally" in the state storage of the second control circuit 20. The motor control system returns to the basic operation state.

Next, a description is given of operation when the second control circuit 20 fails in the basic operation state, the second monitoring circuit 23 detects the failure and records the state in the state storage of the second monitoring circuit 23. The second monitoring circuit 23 then resets the second control circuit 20. The resetting operation is detected by the first control circuit 10, and the first control circuit 10 records the effect of "the second control circuit having failed" in the state storage of the first control circuit 10. The information that "the second control circuit has failed" is recorded in the state storage of the first monitoring circuit 13 through the first control circuit 10 or through a not-illustrated communication path between the second control circuit 20 and the first monitoring circuit 13.

When the failure of the second control circuit 20 is detected by the first control circuit 10 earlier, the first control circuit 10 confirms the effect of "the second monitoring circuit 23 operating normally" in the state storage of the first control circuit 10 and commits the management of the second control circuit 20 to the second monitoring circuit 23. When the second control circuit 20 recovers to the normal state by the resetting of the second monitoring circuit 23, the state of the second control circuit 20 is recorded in the state storage of the related circuit.

The description returns to the state where a failure of the second control circuit 20 is detected in the basic operation state and is recorded in the state storage of the first monitoring circuit 13. In this state, when detecting a failure of the first control circuit 10, the first monitoring circuit 13 executes any one of the following two operations.

(1) First Operation: the first monitoring circuit 13 informs the driver of "failure of the control circuit" and sets the motor circuits 100 and 110 to a fail-safe state to stop the motor control system 300. The fail-safe state refers to a state where at least the motor-driving assistance (assisted state) of the vehicle steering wheel 91 is canceled to allow for manual operation.

(2) Second Operation: in addition to the first operation, the first monitoring circuit resets the first control circuit 10 and observes whether the first control circuit 10 recovers to the normal state. When the first control circuit 10 recovers to the normal state, the first monitoring circuit 13 notifies the driver that the first control circuit 10 is operating normally. The first monitoring circuit 13 then waits for the driver's instruction operation, that is, an instruction whether to allow the electric power steering system to be assisted again and restarts control of the motor circuits 100 and 110 by the first control circuit 10.

Next, a description is given of the method of detecting failures between the control circuits and monitoring circuits. Failures are detected mainly by the following method. It is assumed that communication paths are provided between the control circuits and between the control and monitoring circuits. Failures may be detected by publicly-known failure detection method other than that described below.

In this method, data transmission from one of the circuits to the other one is performed in regular cycles recognized by the both circuits through the corresponding communication path. The other circuit receives and confirms data transmitted regularly to detect the one circuit operating normally. In addition, the same data transmission and detection are performed in the direction from the other circuit to the one circuit independently of the method described above. By recognizing that the above data transmission has failed, it is possible to detect a failure of any one of the circuits.

The basic operation state described in the first embodiment may be replaced with a second basic operation state described below. In the second basic operation state, the switching circuit 40 is set to Switching Mode 3, and the first control wire 12 connects to the first motor wire 50 while the second control wire 22 connects to the second motor wire 51. In the state where Switching Mode 3 is selected, the first motor circuit 100 is controlled by the first control circuit 10 while the second motor circuit 110 is controlled by the second control circuit 20.

When the first control circuit 10 fails in this second basic operation state, for example, the switching circuit 40 is switched to Switching Mode 2 so that the second control circuit 20 controls all the motor circuits. The motor control is thereby returned to the normal state quickly.

Switching when the first control circuit 10 fails is compared with that in the first embodiment. In the first embodiment, the first and second motor circuits 100 and 110 are both switched to the second control circuit. In the second embodiment, only the first motor circuit 100 is switched to the second control circuit. Compared with the first embodiment, fewer signal lines need to be switched, and switching is performed more quickly. In addition, it is possible to reduce noise in the switching process and the like.

In addition to the first embodiment, further consideration is given. In the basic operation state, each control circuit and each monitoring circuit always respectively store in the state storages thereof, whether the other control circuit and the other monitoring circuit are operating normally. To acquire such information, the monitoring communication paths 14 and 24 and inter-control circuit communication path 30 are used.

In order to perform the above communication more accurately, an inter-monitoring circuit communication may be provided between the first and second monitoring circuits in addition to the configuration of FIG. 2. The first monitoring circuit 13 can confirm the states of the second monitoring circuit and second control circuit 20 through the inter-monitoring circuit communication and records the states in the state storage of the first monitoring circuit 13, for example.

Furthermore, communication paths may be added to between the first monitoring circuit 13 and second control circuit 20 and/or between the second monitoring circuit 23 and first control circuit 10. This allows the states thereof to be directly confirmed each other, improving the flexibility of redundant control. This can ensure higher reliability.

Next, a description is given of resetting of the control circuits or monitoring circuits. In the above description, the control or monitoring circuits are usually composed of microcomputers. In such a case, these circuits are reset by transmitting a reset signal to the reset terminal of the microcomputer constituting each circuit.

Alternatively, each of the control and monitoring circuits or a part of the same includes an independent power supply circuit in some cases. The control or monitoring circuit including such a power supply circuit can be reset by turning off the power supply circuit to stop the control or monitoring circuit of interest and then turning on the power supply circuit to restart the control or monitoring circuit of interest.

When the control or monitoring circuit is reset by any method including the aforementioned method, it is also necessary to implement the state where the output of the control or monitoring circuit does not influence the motor circuit, that is, the fail-safe state. This prevents the failing control or monitoring circuit from influencing the motor circuit. The driver needs to stop at least the motor-driven assistance (assisted state) of the vehicle steering wheel 91 to allow for manual operation. Even if the control circuit or the like fails, the motor is therefore not locked, and the driver can operate the steering wheel manually.

The motor control system may be configured to include three or more motor circuits, for example. In this case, the first control circuit 10 controls all the three or more motor circuits in the basic operation state, for example. When the first control circuit 10 fails, the switching circuit 40 switches so that the second control circuit 20 controls all the three of more motor circuits. This increases the redundancy of the motor circuits, further enhancing the reliability against failures.

The motor control system may be configured to include three or more control circuits. In this case, the first control circuit controls all the motor circuits in the basic operation state, for example. When the first control circuit fails, the switching circuit 40 switches so that the second control circuit controls all the motor circuits. When both the first and second control circuits fail, the third control circuit controls all the motor circuits. This increases the redundancy of the motor circuits, further enhancing the reliability against failures.

The embodiments of the disclosure are widely applicable to, for example, electric power steering systems and the like.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor control system that controls a multi-phase electric motor, the motor comprising:
   first and second control circuits; and
   at least two motor circuits each including an inverter and a coil; wherein
   the first and second control circuits include first and second monitoring circuits, respectively;
   a monitoring communication path is provided between the first control circuit and first monitoring circuit and is used for the first control circuit and first monitoring circuit to respectively check whether the first monitoring circuit and first control circuit are operating normally;
   a monitoring communication path is provided between the second control circuit and second monitoring circuit and is used for the second control circuit and second monitoring circuit to respectively check whether the second monitoring circuit and second control circuit are operating normally;
   an inter-control circuit communication path is provided between the first and second control circuits and is used for the first and second control circuits to respectively check whether the second and first control circuits are operating normally;
   a switching circuit is provided between the first and second control circuits and the at least two motor circuits and is selectively set to one of a first interconnection mode in which the first control circuit controls all of the at least two motor circuits and a second interconnection mode in which the second control circuit controls all of the at least two motor circuits;
   the switching circuit is selectively set to the first interconnection mode in a basic operation state of the motor control system;
   when the first monitoring circuit detects a failure of the first control circuit in the basic operation state, the first monitoring circuit resets the first control circuit; and
   the second control circuit detects a reset state of the first control circuit through the inter-control circuit communication path to recognize that the first control circuit has failed and causes the switching circuit to select the second interconnection mode to control all of the at least two motor circuits.

2. The motor control system according to claim 1, wherein when the first control circuit recovers to a normal state by resetting, the second control circuit receives information on a recovery through the inter-control circuit communication path and stores the information in the second control circuit.

3. The motor control system according to claim 1, wherein the first monitoring circuit includes:
    one of a storage region that is capable of being referred to by the second control circuit or the second monitoring circuit and is writable by the first monitoring circuit; and
    a communication path that connects to the second control circuit or the second monitoring circuit and to which the first monitoring circuit outputs; and
    the first monitoring circuit informs the second control circuit that the first control circuit has failed by writing to the storage region or an output signal to the communication path instead of resetting.

4. The motor control system according to claim 1, further comprising a display apparatus, wherein the second control circuit displays on the display apparatus that the first control circuit has failed.

5. The motor control system according to claim 1, wherein
    each of the first and second control circuits includes a state storage that stores at least whether one of the first and second control circuits is operating normally and each of the first and second monitoring circuits includes a state storage that stores at least whether one of the first and second monitoring circuits is operating normally; and
    at least in the basic operation state, each of the first and second control circuits or each of the first and second monitoring circuits uses the corresponding state storage to store whether the one of the first and second control circuits and/or the one of the first and second monitoring circuits is operating normally.

6. The motor control system according to claim 1, wherein when the first monitoring circuit recognizes a failure of the second control circuit and recognizes a failure of the first control circuit in the basic operation state, the first monitoring circuit shifts all of the at least two motor circuits to a fail-safe state to stop motor control.

7. The motor control system according to claim 6, wherein the fail-safe state is implemented by the first monitoring circuit resetting the first control circuit.

8. The motor control system according to claim 1, wherein
    the at least two motor circuits include a first motor circuit and the other motor circuit;
    the switching circuit includes a third interconnection mode through which the first control circuit controls the first motor circuit and the second control circuit controls the other motor circuit; and
    the basic operation state is a state where the switching circuit is selectively set to the third interconnection mode.

9. An electric power steering system that assists steering operation of a driver, the electric power steering system comprising:
    a torque sensor to detect torque generated by the steering operation;
    a motor control system according to claim 1; and
    a motor driven by the motor control system.

* * * * *